(12) United States Patent
Markwart

(10) Patent No.: US 8,074,927 B2
(45) Date of Patent: Dec. 13, 2011

(54) SYSTEM FOR IMPROVING AIR QUALITY IN AN AIRCRAFT PRESSURE CABIN

(75) Inventor: Michael Markwart, Halstenbek (DE)

(73) Assignee: Airbus Deutschland GmbH, Hamburg (DE)

( * ) Notice: Subject to any disclaimer, the term of this patent is extended or adjusted under 35 U.S.C. 154(b) by 651 days.

(21) Appl. No.: 12/279,286

(22) PCT Filed: Feb. 13, 2007

(86) PCT No.: PCT/EP2007/001244
§ 371 (c)(1),
(2), (4) Date: Oct. 22, 2008

(87) PCT Pub. No.: WO2007/093389
PCT Pub. Date: Aug. 23, 2007

(65) Prior Publication Data
US 2009/0277445 A1    Nov. 12, 2009

(30) Foreign Application Priority Data
Feb. 16, 2006   (DE) .......................... 10 2006 007 286

(51) Int. Cl.
*A61M 16/00* (2006.01)
(52) U.S. Cl. ..................................... 244/118.5
(58) Field of Classification Search ................ 244/118.5
See application file for complete search history.

(56) References Cited

U.S. PATENT DOCUMENTS

| | | | |
|---|---|---|---|
| 4,556,180 A | 12/1985 | Manatt | |
| 5,791,982 A * | 8/1998 | Curry et al. ..................... | 454/74 |
| 6,093,238 A | 7/2000 | Huf | |
| 2003/0005719 A1 | 1/2003 | Mitani et al. | |
| 2005/0115565 A1 | 6/2005 | Geary | |
| 2009/0277445 A1 * | 11/2009 | Markwart ................ | 128/203.12 |

FOREIGN PATENT DOCUMENTS

| | | |
|---|---|---|
| DE | 19645764 | 5/1998 |
| EP | 1190945 | 3/2002 |

(Continued)

OTHER PUBLICATIONS

Russian Patent and Trademark Agency, English language translation Russian Office Action for corresponding Application No. 2008131786/11(039712).

(Continued)

*Primary Examiner* — Frank T Palo
(74) *Attorney, Agent, or Firm* — Wood, Herron & Evans, LLP

(57) ABSTRACT

A system for improving the air quality in a pressure cabin of an aircraft includes a recirculation air circuit in which a portion of the cabin air, referred to as recirculation air, is withdrawn from the pressure cabin, filtered and then recirculated into the pressure cabin. To increase the oxygen partial pressure of the air fed back into the pressure cabin, the quantity of recirculation air is passed wholly or partially through a nitrogen generator which generates nitrogen and an oxygen-containing waste gas from the recirculation air supplied. The oxygen-containing waste gas of the nitrogen generator, together with any remaining quantity of recirculation air untreated by the nitrogen generator, is recirculated into the pressure cabin. The nitrogen generator, to which only recirculation air is supplied, utilizes a pressure gradient existing in flight between the pressure cabin and the outside of the aircraft for nitrogen generation.

10 Claims, 3 Drawing Sheets

FOREIGN PATENT DOCUMENTS

| | | | |
|---|---|---|---|
| EP | 1273514 | | 1/2003 |
| GB | 2397821 | | 8/2004 |
| GB | 2397821 A | * | 8/2004 |
| SU | 902094 | | 1/1982 |
| WO | 0228714 | | 4/2002 |
| WO | 2006079782 | | 8/2006 |

OTHER PUBLICATIONS

International Search Report, PCT Form Nos. PCT/ISA/220 (Notification of Transmittal), PCT/ISA/210 (International Search Report), and PCT/ISA/237 (Written Opinion).

* cited by examiner

SYSTEM FOR IMPROVING AIR QUALITY IN AN AIRCRAFT PRESSURE CABIN

TECHNICAL FIELD

The invention relates to a system for improving air quality in an aircraft pressure cabin in which a portion of the air of the pressure cabin, referred to as recirculation air, is withdrawn from the pressure cabin in a recirculation air circuit, conditioned and then returned to the pressure cabin.

BACKGROUND

It has long been known to pressurise aircraft cabins, so that people can spend time in such aircraft cabins even at relatively high flying altitudes without aids such as oxygen masks, etc. Conventionally, so-called bleed air, which is tapped from a compressor stage of the aircraft engine or engines, is used to pressurise an aircraft cabin. This already pressurised bleed air is decompressed to the required cabin pressure in an aircraft air-conditioning system, cooled and otherwise conditioned before being supplied to the aircraft cabin. The air tapped from an engine increases the fuel consumption of the engine, since the tapped proportion of air is no longer available to the engine for thrust generation, so that the compressor of the engine must be designed larger than is actually required purely for thrust generation.

In order to reduce the requirement for bleed air, it is known to skilled persons in the field of aircraft cabin air-conditioning to clean a certain proportion of the air already present in the pressure cabin in a recirculation air circuit and then feed said proportion back to the pressure cabin, instead of constantly supplying outside air produced from bleed air to the pressure cabin.

In order to save weight in aircraft with pressure cabins, the cabin pressure is set so that it corresponds approximately to the air pressure prevailing at an altitude of 2500 m. In this way the pressure differential acting between the pressure cabin and the ambient atmosphere during flight can be kept small, leading to reduced strength requirements and, as a result, lower weight of the aircraft fuselage structure. However, a disadvantage is that, because of the procedure mentioned, the oxygen partial pressure in the aircraft cabin is significantly lower than at ground level, which can be detrimental to comfort during long flights, especially for older and sick passengers. For example, the oxygen partial pressure at ground level is approximately 200 mbar, whereas it is only 175 mbar in the pressure cabin of a commercial aircraft flying at high altitude. To solve this problem it is proposed in German patent 196 45 764 describes a device to enrich the fresh air supplied to the pressure cabin of an aircraft with oxygen. A membrane module which separates the oxygen fraction contained in the exterior air is proposed as the device for enriching the fresh air with oxygen. However, this procedure results in increased consumption of bleed air, since only the proportion of oxygen obtained from the (additional) bleed air by means of the oxygen enrichment device is supplied to the pressure cabin, while the remainder of this additional bleed air escapes unused.

A further possible way of increasing the oxygen partial pressure in an aircraft pressure cabin is disclosed in GB 2 397 821 A. In that document, according to one embodiment the recirculation air is passed through a membrane module in order to generate an oxygen-rich and a nitrogen-rich gas stream, the oxygen-rich gas stream being fed back into the aircraft cabin.

It is the object of the invention to increase the oxygen partial pressure in an aircraft pressure cabin without additional consumption of bleed air, and to execute the raising of the oxygen partial pressure in the pressure cabin with greater overall efficiency.

SUMMARY OF THE INVENTION

This object is achieved according to the invention with a system having the features specified below. According to this system the nitrogen generator is supplied exclusively with recirculation air and the quantity of recirculation air is passed wholly or partially through a nitrogen generator which generates nitrogen and oxygen-containing waste gas from the recirculation air supplied. The oxygen-containing waste gas from the nitrogen generator is recirculated into the pressure cabin together with any remaining quantity of recirculation air untreated by the nitrogen generator.

To generate nitrogen from air, every nitrogen generator requires a motive force to force the air to be treated through, for example, a molecular sieve or a membrane, to mention only two possible methods of nitrogen separation. Conventionally, therefore, a compressor is a component of the nitrogen generator. In the air improvement system according to the invention the nitrogen generator utilises a pressure gradient existing in flight between the pressure cabin and the aircraft exterior. Depending on the flying altitude, this pressure gradient is several hundred millibars. A venturi valve discharging into the ambient atmosphere on the nitrogen outlet side of the nitrogen generator is preferably used to limit the maximum flow through the nitrogen generator.

Alternatively and/or additionally, the pressure gradient produced by a recirculation fan contained in the recirculation air circuit may be used for nitrogen generation by the nitrogen generator. Independently of whether the pressure gradient produced by such a recirculation fan alone, or in combination with the pressure gradient existing between the pressure cabin and the aircraft exterior, is used as a motive force for generating nitrogen in the nitrogen generator, the oxygen-containing waste gas of the nitrogen generator is preferably conducted to the suction side of the recirculation fan and recirculated into the pressure cabin after passing through the recirculation fan. In this way the entire pressure differential of the recirculation fan can be used by the nitrogen generator for the process of nitrogen separation.

If an already existing pressure gradient is used for nitrogen generation, as described above, the above-mentioned compressor of the nitrogen generator may, according to the invention, be dimensioned smaller or even dispensed with entirely, saving cost, weight and installation space.

A considerable number of advantages result from the separation of nitrogen only on the circulation-air side of the aircraft air-conditioning system, that is, only from the recirculation air: the system according to the invention for increasing the oxygen partial pressure in the pressure cabin is wholly independent of bleed air and therefore does not increase the fuel consumption of the aircraft's engines. Because the system according to the invention is independent of bleed air, it can also be operated on the ground when the engines are not running. In addition, according to the invention it is not necessary to impart suitable pressure and temperature values to the air supplied to the nitrogen generator, as is necessary when using bleed air. Instead, the air withdrawn from the pressure cabin and supplied to the nitrogen generator already has the correct pressure and temperature. The technical complexity required is therefore correspondingly less, and the requirement for additional conduits is not large. Additional filtering of the oxygen-containing waste gas produced by the nitrogen generator is also unnecessary, as the recirculated cabin air is in any case drawn off for conditioning via high-efficiency filters. If the quantity of nitrogen removed must be compensated, the total quantity of recirculation air can simply be increased somewhat in order to keep the total air stream constant. Finally, because of the exclusive use of recirculation air and the resulting small fluctuations in the intake parameters, the nitrogen generator can be designed optimally for the desired conditions of use.

If the above-mentioned pressure gradient existing in flight is used for nitrogen generation, the nitrogen generated is discharged into a space the pressure of which is less than that prevailing in the pressure cabin. For example, the nitrogen generated can be simply discharged from the aircraft fuselage. However, in preferred embodiments of the system according to the invention the nitrogen generated is not simply released into the external environment of the aircraft but is conducted, for example, into a landing-gear well of the aircraft. Landing-gear wells are frequently located close to fuel tanks of the aircraft and can contain very hot components (brake discs, tyres), so that inerting the landing-gear well space by introducing nitrogen has hazard-reducing effects.

Alternatively and/or additionally, the nitrogen generated may be conducted into a fuel tank of the aircraft in order to reduce the risk of ignition of fuel vapours, especially when the fuel tank is relatively empty.

Finally, independently of whether or not the nitrogen generator utilises the pressure gradient existing in flight for nitrogen generation, the nitrogen generated may be used, alternatively and/or additionally to the uses already mentioned, as a cooling medium for cooling aircraft components. These components may be, for example, avionics components, which hitherto have usually been cooled using normal air. Here, too, inerting of the avionics cooling "air" achieved by means of the nitrogen is advantageous. If the temperature of the nitrogen generated by the nitrogen generator is not low enough for cooling purposes, the nitrogen generated can be passed for further cooling through a heat exchanger cooled with outside air, which is very cold at today's usual flying altitudes.

The recirculation air circuit through which the circulating air is withdrawn from and returned to the pressure cabin usually contains an air-conditioning filter for the recirculation air withdrawn from the pressure cabin. In that case the system according to the invention is preferably so configured that the quantity of recirculation air to be supplied to the nitrogen generator is drawn off only after it has passed through the air-conditioning filter, since any further filtering of the air quantity treated by the nitrogen generator and returned to the recirculation air circuit is then unnecessary.

So that the system according to the invention can operate as flexibly as possible, the recirculation air circuit preferably includes a mixing chamber through which the quantity of recirculation air flows before re-entering the pressure cabin. In this mixing chamber outside air, that is, conditioned bleed air, may be admixed in a desired proportion without forfeiting the advantages achieved according to the invention.

BRIEF DESCRIPTION OF THE DRAWINGS

An embodiment of a system according to the invention for improving air quality in an aircraft pressure cabin is explained in more detail below with reference to the appended, schematic Figures, in which.

DETAILED DESCRIPTION OF THE PREFERRED EMBODIMENT

Figure 1:
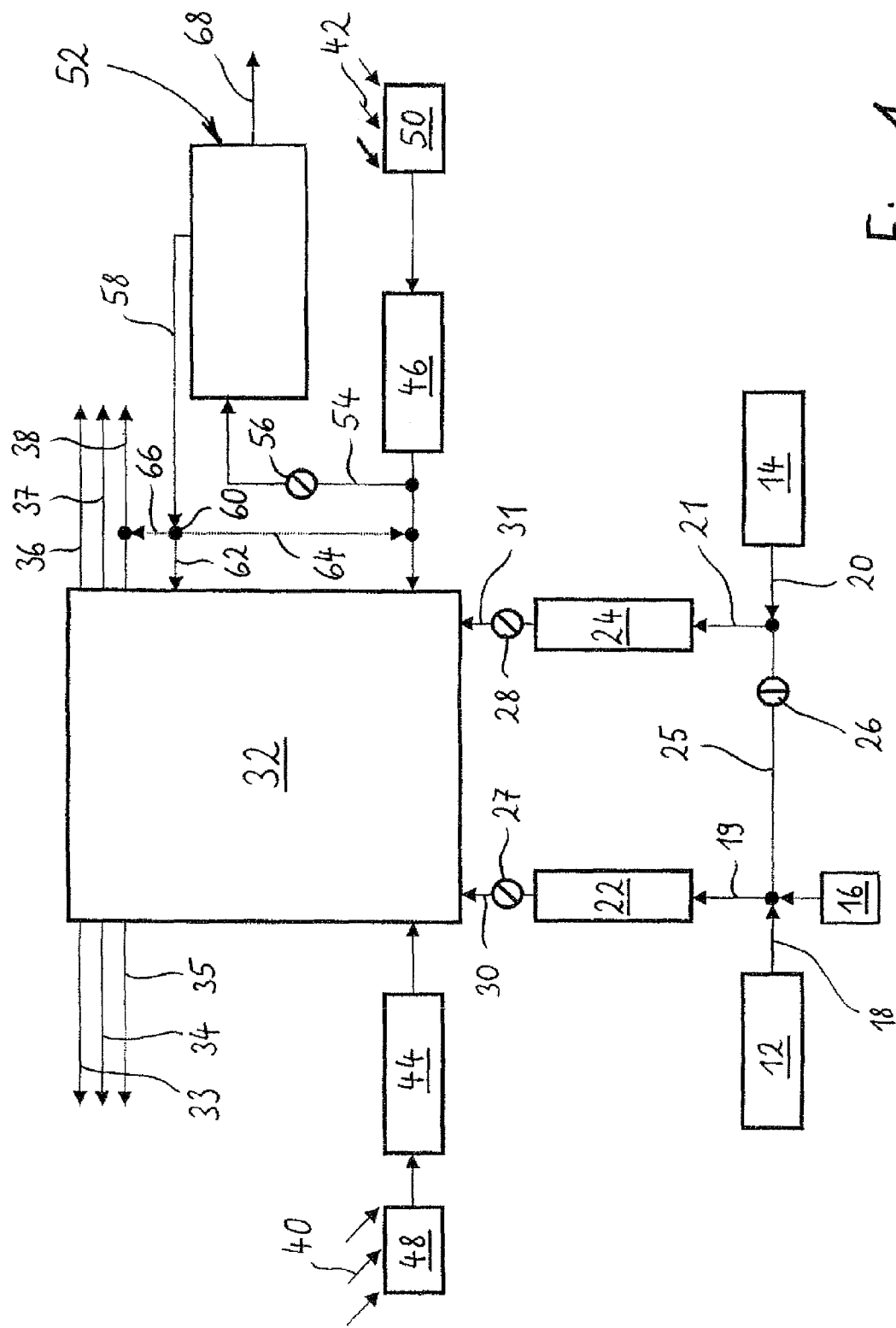
FIG. 1 is a block diagram showing the basic arrangement and connection to other components of an aircraft air-conditioning system in a first embodiment of the system according to the invention.

FIG. 1, which shows a first embodiment, relates to an aircraft which has two engines 12, 14 and an auxiliary power unit 16, although it is self-evident that the basic operation of the system does not depend on the precise number of engines or on the presence of an auxiliary power unit.

To pressurise the cabin of the aircraft (not further illustrated here), bleed air from the engine 12 and/or the engine 14 and/or the auxiliary power unit 16 is supplied to two air-conditioning units 22, 24 via lines 18, 19 and 20, 21. A connecting line 25 in which a stop valve 26 is arranged is used to supply bleed air from the engine 12 and/or the auxiliary power unit 16 simultaneously to both air-conditioning units 22, 24 or to supply air from the engine 14 simultaneously to both air-conditioning units 22, 24 With the stop valve 26 closed the air-conditioning unit 22 is supplied with bleed air only from the engine 12 and/or the auxiliary power unit 16, while the air-conditioning unit 24 is supplied with bleed air only from the engine 14.

In a manner known to specialists skilled in the present field, the air-conditioning units 22, 24 are used to cool and condition the hot bleed air so that it can be conducted into the aircraft cabin. Connected downstream of each air-conditioning unit 22, 24 is a control valve 27, 28 with which the quantity of the air stream flowing from the air-conditioning units 22, 24 can be regulated.

The bleed air conditioned by the air-conditioning units 22, 24 is directed to a mixing chamber 32 via lines 30, 31 in which the control valves 27, 28 are arranged. This mixing chamber 32 forms part of a so-called recirculation air circuit which is used to extract a portion of the air contained in the pressure cabin of the aircraft, referred to as recirculation air, from the pressure cabin, to condition said portion and then return it to the pressure cabin. Such a procedure saves bleed air, since the entire volume of the pressure cabin does not need to be constantly replaced with outside air (which, as bleed air, is suitably conditioned by the air-conditioning units 22, 24 before being supplied to the pressure cabin), but only a part thereof.

Lines 33, 34, 35 and 36, 37, 38 lead from the mixing chamber 32 to the different ventilation zones of the pressure cabin of the aircraft. Cabin air is extracted from the pressure cabin at 40 and 42 by means of respective recirculation fans 44, 46 and passed through air-conditioning filters 48, 50 located upstream of respective recirculation fans 44, 46 in the flow direction, and then directed into the mixing chamber 32. In the mixing chamber 32 a desired proportion of fresh outside air may be admixed before the air mixture thus obtained is fed back into the pressure cabin of the aircraft via the lines 33 to 38.

In the embodiment illustrated the total recirculation air circuit consists of a left-hand recirculation air circuit, formed by the air supply lines 33, 34, 35, the air conditioning filter 48, the recirculation fan 44 and the mixing chamber 32, and a right-hand recirculation air circuit formed by the air supply lines 36, 37, 38, the air-conditioning filter 50, the recirculation fan 46 and the mixing chamber 32.

To improve the air quality in the pressure cabin of the aircraft, a nitrogen generator 52, to which circulation air from the right-hand recirculation air circuit is supplied via a line 54, is provided in the right-hand recirculation air circuit. A control valve 56 is arranged in the line 54 in order to regulate the quantity of air diverted to the nitrogen generator 52 downstream of the recirculation fan 46. From the recirculation air supplied to it the nitrogen generator 52 generates nitrogen and an oxygen-containing waste gas. A molecular sieve, for example, may be used for this purpose, or a suitable membrane in the form, for example, of a hollow-fibre module. The oxygen-containing waste gas, which is enriched with oxygen as compared to the circulation air supplied to the nitrogen generator 52, is discharged from the nitrogen generator 52 via a line 58 and supplied to a multiway valve 60 from which it can be supplied via lines 62, 64 to the mixing chamber 32 and/or fed directly to specific ventilation zones via lines (of which only a line 66 opening into the line 38 is shown as an example here), in order to increase generally or selectively the oxygen partial pressure of the air supplied to the pressure cabin. The nitrogen produced by the nitrogen generator 52 escapes via a line 68 and can either be discharged unused via the exterior of the aircraft or used in the aircraft for inerting particular spaces (landing-gear well, fuel tanks) and/or for cooling, for example, avionics components.

Figure 2:
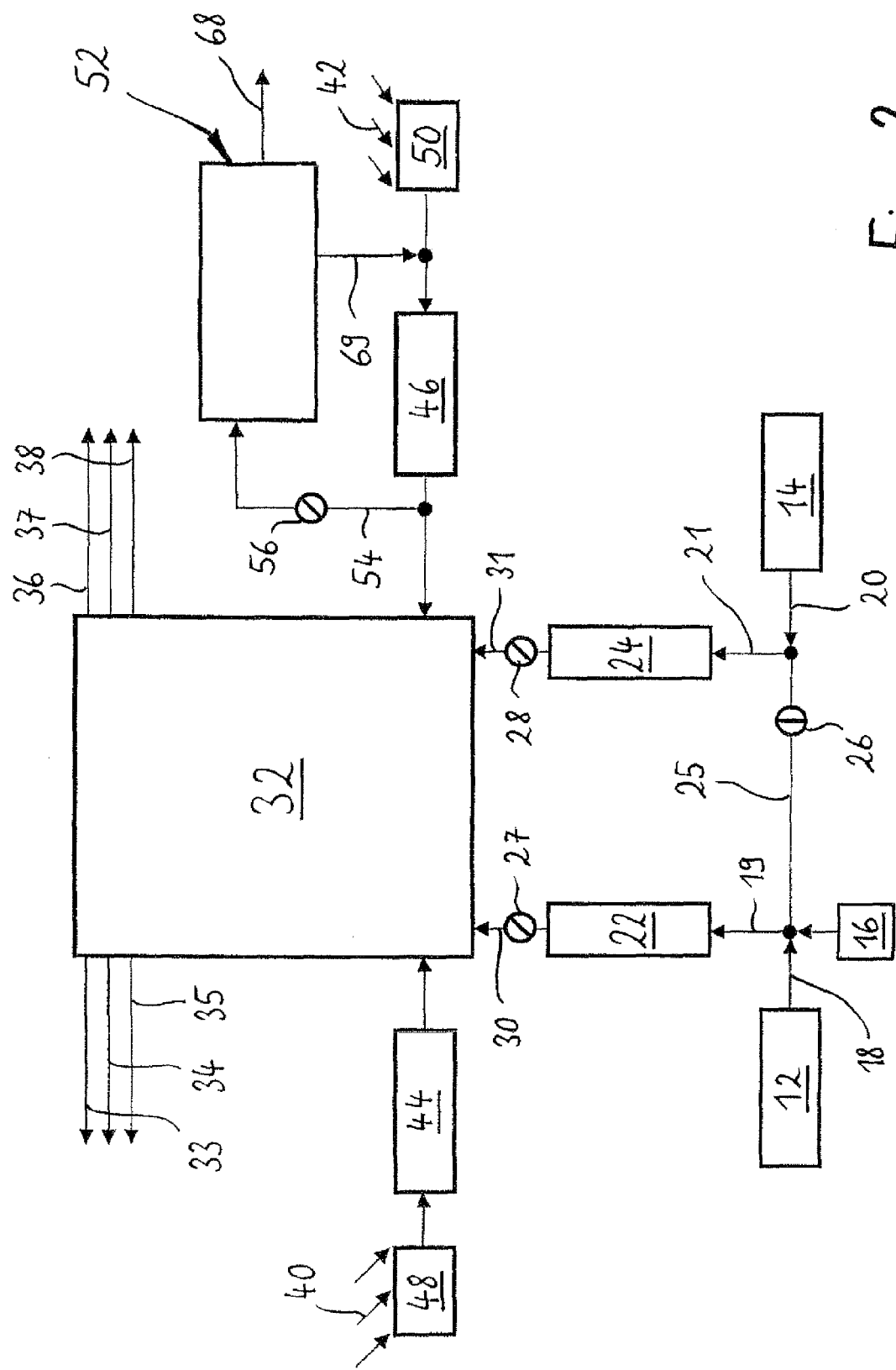
FIG. 2 is a block diagram similar to FIG. 1 of a second embodiment.

The second embodiment, shown in FIG. 2, differs from the first embodiment explained above in that the oxygen-containing waste gas coming from the nitrogen generator 52 is fed back to the suction side of the recirculation fan 46 by means of a line 69. In this way the full pressure difference generated by the recirculation fan 46 can be used as motive force for driving the nitrogen generator 52. A compressor (not shown), required as a component of the nitrogen generator 52 in the first embodiment, can therefore be omitted or designed significantly smaller, thus saving energy, weight and cost. Although, in the second embodiment, it is shown that after the oxygen-containing waste gas has passed through the recirculation fan 46 only this oxygen-containing waste gas is supplied to the mixing chamber 32 (or fed back to the nitrogen generator 52 in order to separate further nitrogen), it is self-evident that according to a further alternative not shown here the oxygen-containing waste gas, after passing through the recirculation fan 46 as in the first embodiment, may be supplied directly to one or more lines 33 to 38 in order to selectively raise the oxygen partial pressure in specific ventilation zones of the aircraft cabin.

Figure 3:
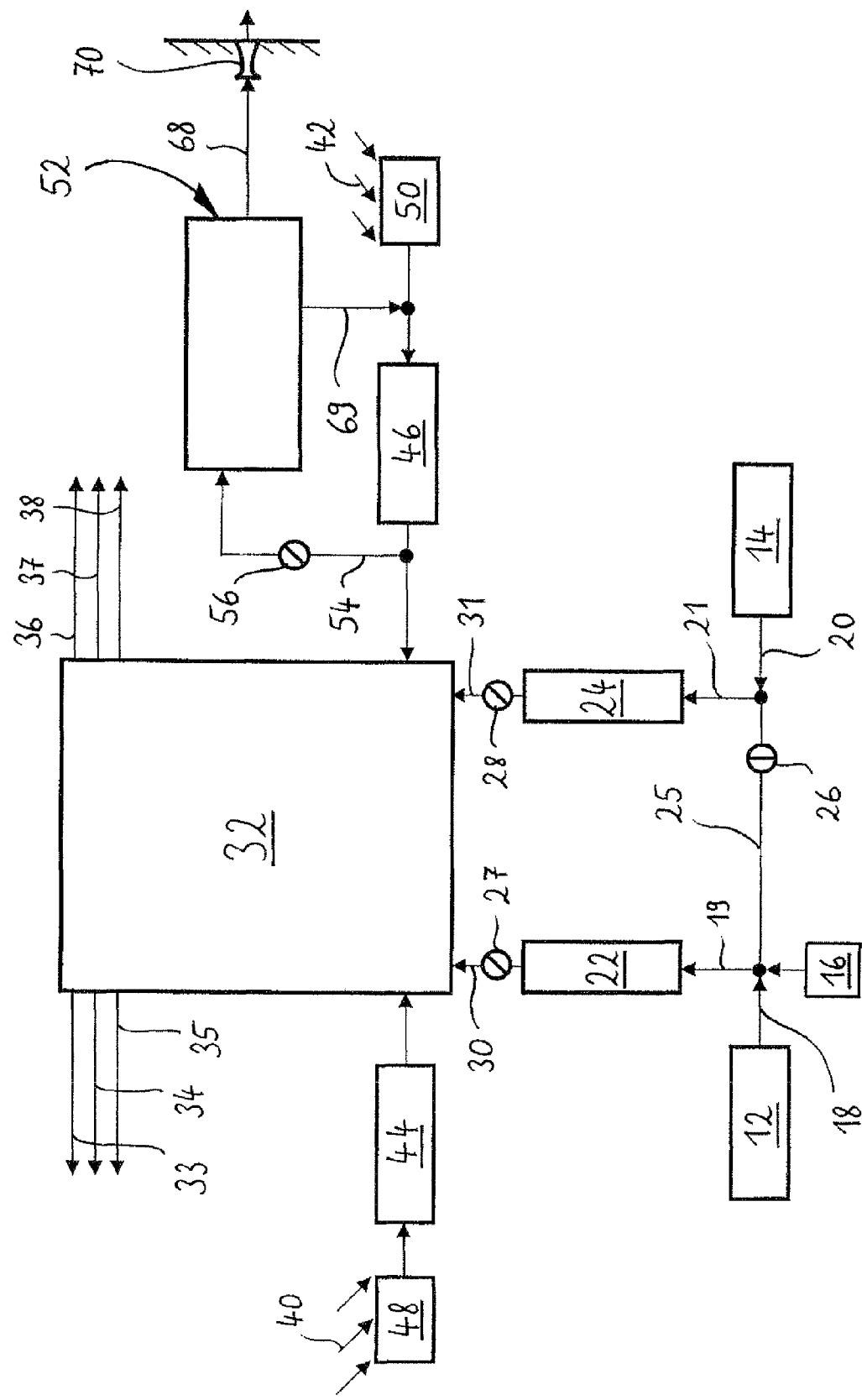
FIG. 3 is a block diagram of a third, further modified embodiment.

The third embodiment, shown in FIG. 3, corresponds substantially to the second embodiment explained above but additionally includes at the end of the line 68 a venturi valve 70, which vents the nitrogen generated by the nitrogen generator 52 into the ambient atmosphere of the aircraft. In this way, in addition to the pressure difference generated by the recirculation fan 46, the pressure difference existing between the pressure cabin and the outside of the aircraft is additionally made utilisable as a driving pressure gradient acting in the nitrogen generator 52. According to an alternative (not shown here), the oxygen-containing waste gas of the nitrogen generator 52 is not fed back to the suction side of the recirculation fan 46 but leaves the nitrogen generator 52 in the manner shown in the first embodiment. In this alternative the driving pressure gradient acting in the nitrogen generator 52 is provided exclusively by the pressure difference existing between the pressure cabin and the outside of the aircraft, optionally supplemented by a small compressor which is used at low flying heights or on the ground, when the pressure difference between the pressure cabin and the outside of the aircraft is small or non-existent.

The venturi valve 70 limits the flow through the nitrogen generator 52 to a predefined value which is determined by the narrowest cross-section in the venturi valve 70. Because, for physical reasons, supersonic velocities cannot occur in a venturi valve, above a given differential pressure value which is supplied via the venturi valve, a further increase in the differential pressure does not lead to a higher mass flow through the venturi valve.

In all the embodiments shown and described, preferably only a relatively small portion of the recirculation air is passed through the nitrogen generator 52, for example, from approximately 2% to approximately 5%, although this value is strongly dependent on the desired increase in oxygen partial pressure.

The nitrogen produced by the nitrogen generator 52 is preferably not simply discharged into the ambient atmosphere but is directed, for example, into the landing-gear wells and/or the fuel tank or tanks of the aircraft for inerting thereof. Alternatively and/or additionally, the nitrogen generated may be used as a coolant for cooling purposes, although for this purpose it is necessary to re-pressurise said nitrogen, which may be effected by means of a small compressor (not shown).

The invention claimed is:

1. A system for improving air quality in an aircraft pressure cabin, comprising:
    a recirculation air circuit in which a portion of the cabin air, referred to as recirculation air, is withdrawn from the pressure cabin, is conditioned and then is recirculated into the pressure cabin; and
    a nitrogen generator coupled to the recirculation air circuit and through which the quantity of recirculation air is passed wholly or partially so that the nitrogen generator generates nitrogen and an oxygen-containing waste gas from the recirculation air supplied, wherein
    the oxygen-containing waste gas generated by the nitrogen generator, together with any remaining quantity of recirculation air untreated by the nitrogen generator, is recirculated into the pressure cabin at a location downstream of the nitrogen generator,
    only recirculation air is supplied to the nitrogen generator, the nitrogen generator utilizes a pressure gradient existing in flight between the pressure cabin and the outside of the aircraft to actuate flow of recirculation air through the nitrogen generator for nitrogen generation, and
    the oxygen-containing waste gas generated by the nitrogen generator is fed back to the recirculation air circuit at a location upstream of the nitrogen generator.

2. The system of claim 1, further comprising:
    a venturi valve configured to receive the nitrogen generated by the nitrogen generator, the venturi valve venting the nitrogen into the ambient atmosphere so as to limit the maximum flow through the nitrogen generator.

3. The system of claim 1, further comprising:
    a recirculation fan coupled to the recirculation air circuit such that a pressure gradient generated by the recirculation fan actuates flow of recirculation air through the nitrogen generator for generating nitrogen.

4. The system of claim 3, wherein the oxygen-containing waste gas generated by the nitrogen generator is conducted to a suction side of the recirculation fan such that the entire pressure gradient generated by the recirculation fan is used to actuate flow of recirculation air through the nitrogen generator, the oxygen-containing waste gas being recirculated into the pressure cabin after passing through the recirculation fan.

5. The system of claim 1, further comprising:

an air-conditioning filter coupled to the recirculation air circuit such that the quantity of recirculation air to be supplied to the nitrogen generator is drawn off downstream of the air-conditioning filter.

6. The system of claim 1, further comprising:

a mixing chamber coupled to the recirculation air circuit and through which the quantity of recirculation air passes before re-entering the pressure cabin, outside air being mixed with the recirculation air in the mixing chamber.

7. The system of claim 1, wherein the nitrogen generated by the nitrogen generator is conducted into a landing-gear well of the aircraft.

8. The system of claim 1, wherein the nitrogen generated by the nitrogen generator is conducted into a fuel tank of the aircraft.

9. The system of claim 1, wherein the nitrogen generated by the nitrogen generator is used as a coolant for cooling aircraft components.

10. The system of claim 9, wherein the aircraft components cooled by the nitrogen are avionics components.

\* \* \* \* \*